US012607910B2

(12) United States Patent (10) Patent No.: US 12,607,910 B2

Hjelmström et al. (45) Date of Patent: Apr. 21, 2026

(54) OPTICAL SYSTEM COMPRISING A PROBE FOR IMAGE SENSOR DETECTION

(71) Applicant: Axis AB, Lund (SE)

(72) Inventors: Jonas Hjelmström, Lund (SE); Ola Håkansson, Lund (SE); Viktor Nordblom, Lund (SE)

(73) Assignee: Axis AB, Lund (SE)

( * ) Notice: Subject to any disclaimer, the term of this patent is extended or adjusted under 35 U.S.C. 154(b) by 447 days.

(21) Appl. No.: 18/296,460

(22) Filed: Apr. 6, 2023

(65) Prior Publication Data

US 2023/0375902 A1 Nov. 23, 2023

(30) Foreign Application Priority Data

May 19, 2022 (EP) ..................................... 22174305

(51) Int. Cl.
| | |
|---|---|
| *G02B 7/02* | (2021.01) |
| *G02B 7/10* | (2021.01) |
| *G03B 17/14* | (2021.01) |
| G02B 7/04 | (2021.01) |

(52) U.S. Cl.
CPC ............... *G03B 17/14* (2013.01); *G02B 7/02* (2013.01); *G02B 7/023* (2013.01); *G02B 7/10* (2013.01); *G02B 7/04* (2013.01)

(58) Field of Classification Search
CPC .......... G02B 7/021; G02B 7/023; G02B 7/08; G02B 7/09; G02B 7/38; G02B 7/02; G02B 7/04; G02B 7/10; G02B 27/646; G03B 3/10; G03B 5/00; G03B 13/36;
(Continued)

(56) References Cited

U.S. PATENT DOCUMENTS

| | | | |
|---|---|---|---|
| 8,781,313 B2 | 7/2014 | Uchiyama | |
| 11,243,455 B2* | 2/2022 | Mireault | ............ G02B 13/0065 |
| 2010/0110270 A1 | 5/2010 | Sekimoto et al. | |

(Continued)

FOREIGN PATENT DOCUMENTS

| | | |
|---|---|---|
| EP | 0588585 A1 | 3/1994 |
| EP | 2270568 A1 | 1/2011 |

(Continued)

OTHER PUBLICATIONS

Chinese Office Action issued on May 30, 2025 for Chinese Patent Application No. 202310495345.8.

(Continued)

*Primary Examiner* — Mahidere S Sahle
(74) *Attorney, Agent, or Firm* — Volpe Koenig

(57) ABSTRACT

An optical system comprises a lens system having at least one movable lens; a lens housing having an opening, the lens housing attachable to an image sensor so that the lens, the opening, and the image sensor are arrangeable along an axis with the opening between the lens and the image sensor; a probe extending towards the opening and that is fixed in relation to the lens; an actuation system for moving the lens along the axis and the probe parallel with the axis, so that the probe reaches out to a location where the image sensor is arrangeable; and a control system for controlling the actuation system to move the lens and the probe and to detect that a motion of the lens and the probe is prevented by the probe hitting a surface fixed in relation to the image sensor.

13 Claims, 6 Drawing Sheets

(58) Field of Classification Search
CPC ............................... G03B 17/14; G03B 30/00;
G03B 2205/0007; G03B 2205/0015;
G03B 2205/0069
USPC .................................. 359/694–706, 822–826
See application file for complete search history.

(56) References Cited

U.S. PATENT DOCUMENTS

| | | |
|---|---|---|
| 2013/0314810 A1 | 11/2013 | Sekimoto et al. |
| 2021/0341705 A1 | 11/2021 | Birnbaum et al. |

FOREIGN PATENT DOCUMENTS

| | | |
|---|---|---|
| EP | 2739034 A2 | 6/2014 |
| JP | 2015-087648 A | 5/2015 |
| KR | 100824998 B1 | 4/2008 |
| KR | 10-2011-0022936 A | 3/2011 |

OTHER PUBLICATIONS

Extended European Search Report dated Nov. 11, 2022 for European Patent Application No. 22174305.7.

* cited by examiner

OPTICAL SYSTEM COMPRISING A PROBE FOR IMAGE SENSOR DETECTION

FIELD OF INVENTION

The present disclosure generally relates to the field of camera surveillance, and in particular to an optical system comprising a movable lens.

TECHNICAL BACKGROUND

A typical camera system comprises an objective having several lenses that focuses light onto an image sensor. The distance between the lenses and the image sensor may be varied for changing imaging focus or zoom settings of the camera system. This means that it is important to have sufficient resolution in the motion of the lenses and knowledge of the relative position between the lenses and the image sensor.

However, the distance between the lenses and the image sensor is often unknown or it drifts during use of the camera system. This is due to for example, manufacturing tolerances related to the production method used for producing camera system, and/or that the distance changes due to temperature variations. This can lead to various problems such as focus drift and failure to calibrate lenses.

Accordingly, there is a need for improvements with regards to calibrating the position of lenses relative the corresponding image sensor.

SUMMARY

In view of above-mentioned and other drawbacks of the prior art, it is an object of the present disclosure to provide an improved optical system that alleviates at least some of the drawbacks of prior art.

According to a first aspect of the present disclosure, there is provided an optical system comprising a lens system comprising at least one movable lens; a lens housing accommodating the lens system and comprising an opening, the lens housing is attachable to an image sensor housing for an image sensor so that the at least one lens, the opening, and the image sensor are arrangeable along an axis with the opening between the at least one lens and the image sensor; a probe extending towards the opening and that is fixed in relation to the at least one lens; an actuation system configured to move the at least one lens along the axis and the probe parallel with the axis, relative the opening so that the probe reach out through the opening to a location where the image sensor is arrangeable; and a control system configured to control the actuation system to move the at least one lens and the probe and to detect that a motion of the at least one lens and the probe is prevented by that the probe hits a surface fixed in relation to the image sensor.

The present disclosure is directed to mounting a probe so that it moves with the at least one lens and can reach and touch a surface that is fixed with respect to the image sensor. By means of the probe, a relatively cost-efficient yet accurate way of calibrating the position of the at least one lens is obtained.

The axis along which the at least one lens, the opening, and the image sensor are arrangeable is a virtual axis and is often referred to an optical axis, i.e., the axis along which light passes through the at least one lens and being focused onto the image sensor.

An image sensor typically includes a matrix of photosensitive pixels configured to sense light and convert it to a voltage signal. Image sensors are considered known per se and their operation will not be discussed herein. A surface fixed in relation to the image sensor should be interpreted as a surface fixed in relation to the active part of the sensor, the active part being the part including the pixels.

In one embodiment, the control system may be configured to, when it is detected that the motion of the probe is prevented, conclude that the position of the image sensor is found, and move the at least one lens relative to the found position for achieving a desired imaging setting according to a predetermined distance between the at least one lens and the image sensor. Thus, once the probe hits the surface, the control system detects that the actuation system is unable to move the at least one lens any further and can conclude that the probe has reached the surface. The position of the at least one lens is considered to be at a known position with respect to the image sensor from which position the at least one lens can be moved depending on a desired setting.

In one embodiment, the optical system may comprise a lens holder attached to at least one lens, wherein the probe is attached to the lens holder. The lens holder is fixed in relation to the respective lens and therefore provides a suitable place for attaching the probe.

In one embodiment, the probe and lens holder may be made in a single piece. This advantageously eliminates tolerance errors that may appear if a separate probe is attached to a separate lens holder. For example, the probe and the lens holder may be molded in a single mold. As a further example, the probe and the lens holder may be made from a single 3D-printing process or from a single workpiece in a milling process. The probe and the lens holder are thus preferable made from the same material.

In one embodiment, the surface may be a surface of the image sensor, wherein the probe is configured to hit the surface of the sensor when the image sensor housing is attached to the lens housing and the probe is moved to the image sensor location. To eliminate further sources of error in determining the relative location between the at least one lens and the image sensor, it is advantageous if the surface is part of the image sensor itself.

In one embodiment, the surface may be an inactive part of the image sensor, wherein the probe is configured to reach the inactive part of the image sensor when the image sensor housing is attached to the lens housing and the probe is moved to the image sensor location. The inactive part of the image sensor may be on the chip or die of the image sensor adjacent to the pixels of the image sensor. The surface may be on the printed circuit board supporting the image sensor. In one possible implementation, the surface is an outer surface of a cover glass of the image sensor.

In one embodiment, the actuation system may comprise a motor and an axle attached to a lens holder for moving the at least one lens. The motor may be a step motor which rotates the axle about its longitudinal axis. A connection between the axle and the lens holder is configured so that the lens holder moves along the longitudinal axis of the axle when the axle rotates about the longitudinal axis.

In one embodiment, the probe may be elongated with one end portion being configured to reach the location where the image sensor is arrangeable when the at least one lens is moved towards the opening.

In one embodiment, the control system may be configured to receive an indication that a present imaging performance has drifted from a desired imaging setting, and, in response, control the actuation system to move the at least one lens, and, when it is detected that the motion of the probe is prevented, conclude that the location of the image sensor is found, and to move the at least one lens relative to the found position for achieving the desired imaging setting. Thus, the optical system may advantageously be configured to actively re-calibrate the position of the lenses in response to detecting drift.

In one embodiment, the optical system may comprise a plurality of lens groups, and one probe for each lens group. Each lens group comprises at least one lens and the corresponding actuation system moves the entire group as a single unit. Thus, all lenses of the group and the probe of that group moves as one unit, fixed with respect to each other. Advantageously, the position of each group may be calibrated individually.

According to a second aspect of the present disclosure, there is provided a camera system comprising an optical system according to any one of the herein described embodiments, and an image sensor arranged in an image sensor housing removably attached to the lens housing. The camera system may further comprise the image sensor housing.

In one embodiment, the control system may is configured to, upon start of the camera system, perform a calibration of lens positions by controlling the motion of the at least one lens to find the position of the at least one lens relative the image sensor, and use the position for achieving a desired imaging setting.

Further embodiments of, and effects obtained through, this second aspect of the present disclosure are largely analogous to those described above for the first aspect of the disclosure.

According to a third aspect of the present disclosure, there is provided a method for positioning of a lens group relative an image sensor, comprising: moving at least one lens and a probe fixed in relation to the at least one lens along an axis towards an image sensor, the probe is moved out through an opening of a lens housing accommodating the at least one lens and the probe, detecting that a motion of the at least one lens and the probe is prevented by that the probe hits a surface that is fixed in relation to the image sensor, and concluding that the position of the image sensor is found, and moving the at least one lens relative to the found position for achieving a desired imaging setting according to a predetermined distance between the at least one lens and the image sensor.

Further embodiments of, and effects obtained through, this third aspect of the present disclosure are largely analogous to those described above for the first aspect and the second aspect of the disclosure.

According to a fourth aspect of the present disclosure, there is provided a control unit for controlling an actuating system for moving a lens group, and for performing the steps of the method described herein.

Further embodiments of, and effects obtained through, this fourth aspect of the present disclosure are largely analogous to those described above for the first aspect, the second aspect, and the third aspect of the disclosure.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the disclosure, including its particular features and advantages, will be readily understood from the following detailed description and the accompanying drawings, in which.

DETAILED DESCRIPTION

Figure 1:
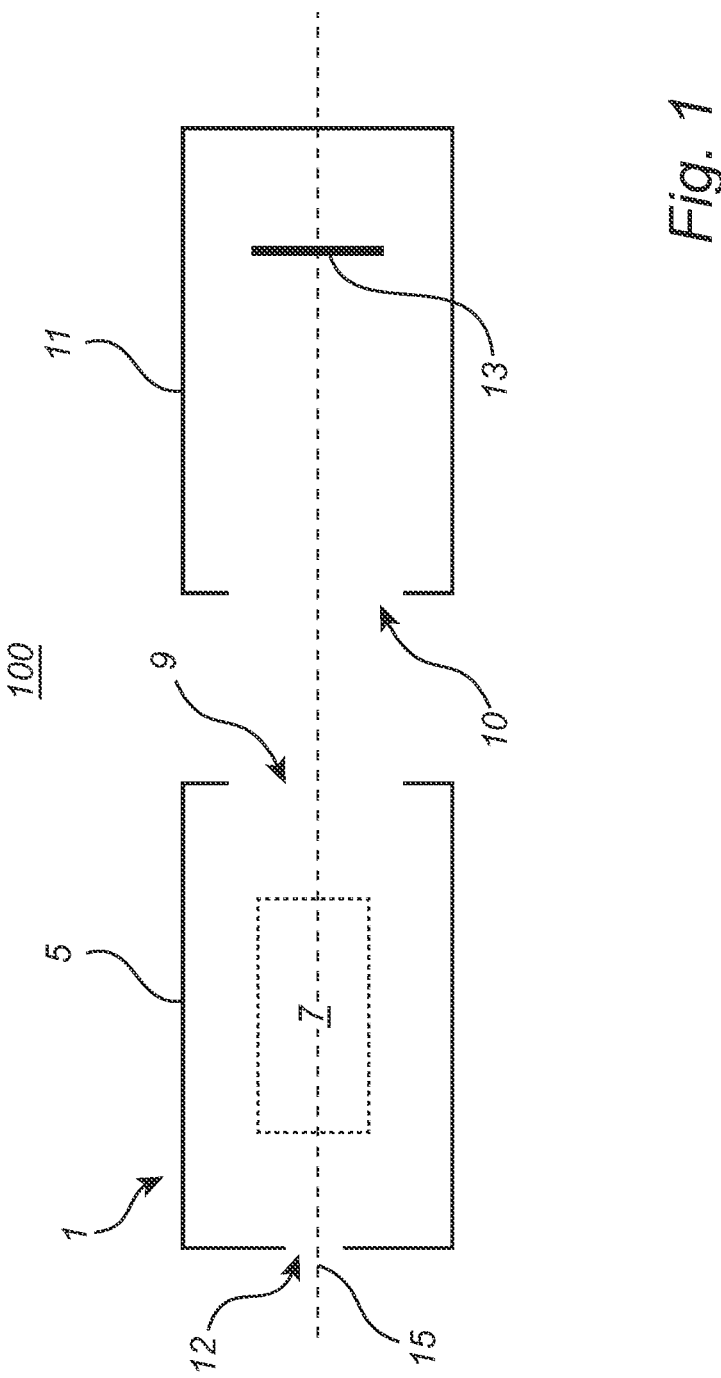
FIG. 1 conceptually illustrates a camera system comprising a lens housing and a image sensor housing according of embodiments of the disclosure.

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled person. Like reference characters refer to like elements throughout.

Turning now to the drawings and to FIG. 1 in particular, there is shown a camera system 100. The camera system 100 comprises an optical system 1 comprising a housing, herein referred to as a lens housing 5. The optical system 1 further comprises a lens system 7 accommodated in the lens housing 5.

Furthermore, the camera system 100 comprises an image sensor 13 arranged in an image sensor housing 11 that can be removably attached to the lens housing 5. When the camera system 100 is operative in imaging a scene, light enters through an aperture 12 in the lens housing 5, is redirected by the lens system 7 according to a desired imaging setting, e.g., a zoom or focus setting, before the light is focused onto the image sensor 13. The light path through the lens system 7, via an opening 9 in the lens housing 5, and finally to the image sensor 13 via the opening 10 in the image sensor housing 11 is along an axis 15, typically referred to as an optical axis of the camera system 100. The opening 9, the lens system 7 and the image sensor 13 are located on the optical axis 15 with the opening 9 between the lens system 7 and the image sensor 13. The opening 10 of the image sensor housing 11 is located on the optical axis 15 between the lens system 7 and the image sensor 13.

A common problem in traditional cameras is that the distance between the lenses and the image sensor is difficult to know with high accuracy due to tolerances in the manufacturing or for example due to material expansion caused by temperature fluctuations. The distance between the surface of the lenses closest to the image sensor and the image plane is known as the back focal length and is of importance for imaging settings such as focus and zoom. To more accurately determine or calibrate the distance between the image sensor and the lenses, a probe will be discussed in more detail below.

Figure 2A:
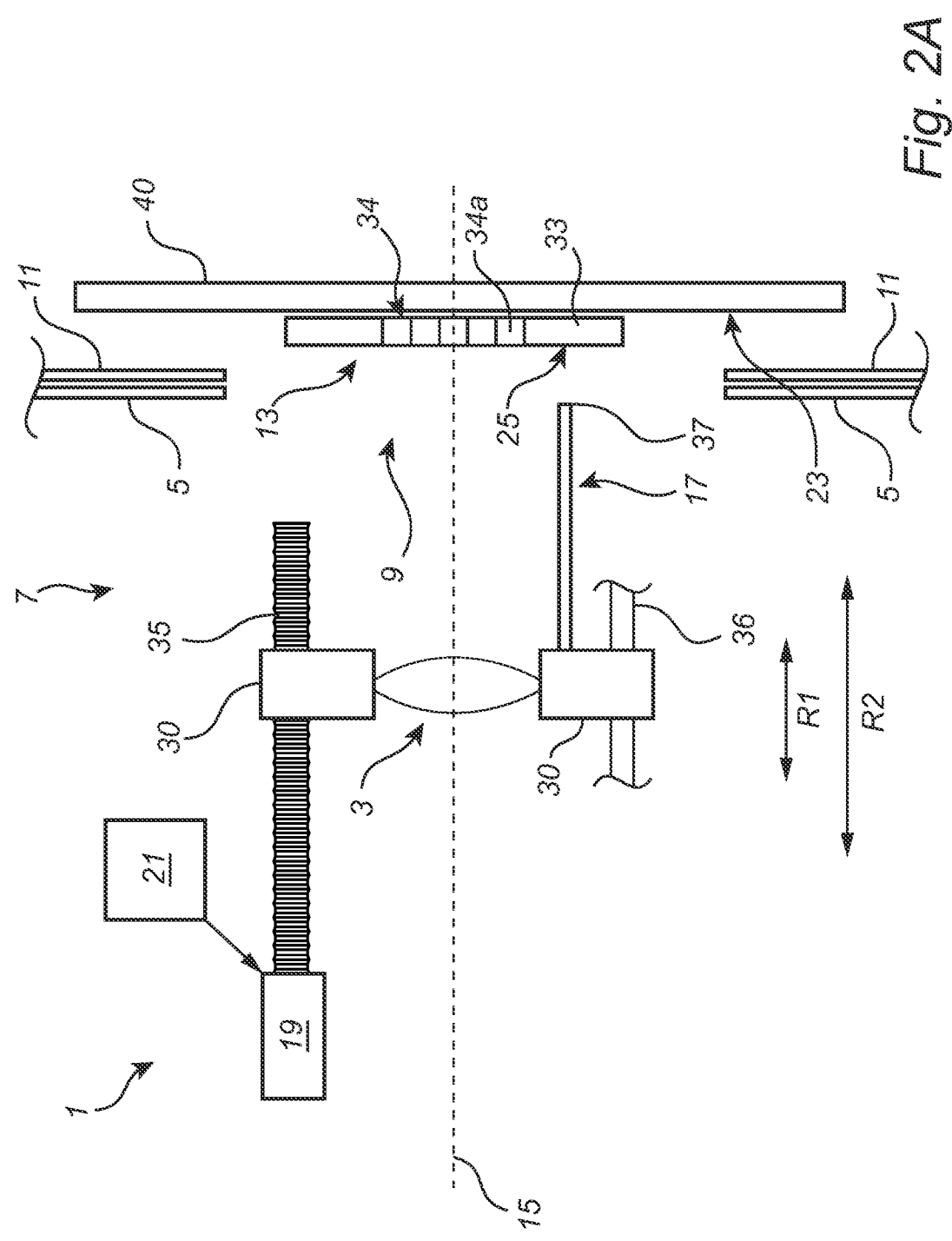
FIG. 2A conceptually illustrates an optical system in a first position according to embodiments of the disclosure.

FIG. 2A conceptually illustrates an embodiment of the optical lens system 7 of the optical system 1. The lens system 7 comprises at least one movable lens 3. As described with reference to FIG. 1, the lens system 7 is accommodated in a lens housing 5 comprising the opening 9. The lens housing 5 is attachable to the image sensor housing 11 accommodating the image sensor 13 so that the at least one lens 3, the opening 9, and the image sensor 13 are arrangeable along an axis 15 with the opening 9 between the at least one lens 3 and the image sensor 13.

The lens system 7 comprises a probe 17 extending towards the opening 9 and that is fixed in relation to the at least one lens 3. In this example embodiment, the lens 3 is attached to a lens holder 30, and the probe 17 is attached to the lens holder 30. This ensures that the relative position of the probe 17 with respect to the lens 3 is fixed. In preferred embodiments, the probe 17 and the lens holder 30 is made in a single piece. For example from the same workpiece in a milling process, in a single mold, or from a single 3D-printing step or process. The probe 17 may for example be made from a plastic or metal material. The lens holder 30 is slidably arranged on a guide rod 36 that guides the motion of the lens holder 30.

Further, the optical system 1 comprises an actuation system 19 configured to move the at least one lens 3 along the axis 15 and the probe 17 parallel with the axis 15, relative the opening 9. The probe 17 can reach out through the opening 9 to a location where the image sensor 13 is arrangeable, in its housing 11. The probe 17 is preferably elongated, with one end portion 37 of the probe 17 being configured to reach the location where the image sensor 13 is arrangeable when the at least one lens 3 is moved towards the opening 9 and the probe 17 reaches out through the opening 9 to the location of the image sensor 13 in its housing 11.

The optical system 1 further comprises a control system 21 configured to control the actuation system 19 to move the at least one lens 3 and the probe 17. The control system 21 is further configured to detect that a motion of the at least one lens 3 and the probe 17 is prevented by that the probe 17 hits a surface 23, 25 fixed in relation to the image sensor 13.

Once the control system 21 detects that the motion of the probe 17 is prevented, the control system 21 concludes that the position of the image sensor 13 is found. The control system 21 can subsequently move the at least one lens relative to the found position for achieving a desired imaging setting according to a predetermined distance between the at least one lens and the image sensor. Even if the absolute distance between the lens 3 and the image sensor could be determined with knowledge of the length of the probe 17, it is more beneficial that a relative distance can be found, and that from that found position, it is possible to move the lens 3 a known distance to achieve the desired imaging setting.

When the control system 21 concludes that the position of the image sensor 13 is found, the distance between the image sensor and the surface of a lens closest to the image sensor can be determined from knowledge of the length of the probe and the location of the surface that it touches. This measurement is known as a back focal length measurement.

The at least one lens 3 is movable in two different ranges. An optical range, R1, and a mechanical range R2 which are only conceptually illustrated in FIG. 2A and are not necessarily to scale. The actual ranges will depend on the specific implementation at hand. The optical range R1 is the range used for adjusting the optical setting of the camera. For example, the at least one lens 3 is movable in the optical range R1 for adjusting settings such as focus and zoom. The mechanical range R2 is larger than the optical range R1 and is the sum of an optical range R1 and an addition distance often used for padding which ensures that the lenses are never moved into any physical walls inside the housing. To allow for the motion of the probe 17 to reach the surface 23,

25, the mechanical range is advantageously increased by a small range, such as a few tens of millimeters. This additional range is used for moving the probe so that it can touch the surface 23, or 25 depending on the implementation, so that a back focal length measurement can be performed. The camera 100 is typically not used during the back focal length measurement since the lenses are out of the optical range. However, the back focal length measurement typically only takes a few seconds.

Figure 2B:
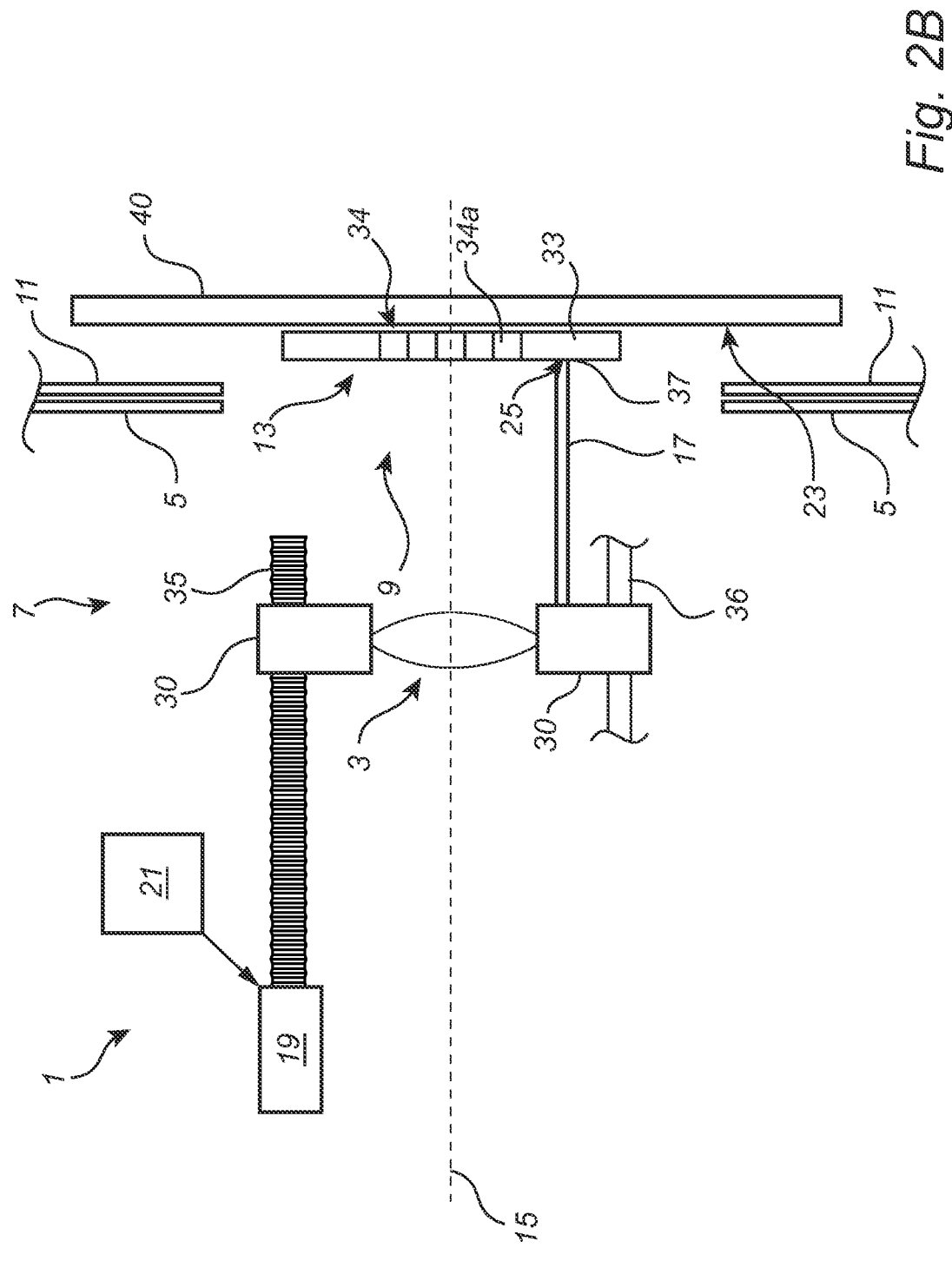
FIG. 2B conceptually illustrates an optical system in a second position according to embodiments of the disclosure.
Figure 2C:
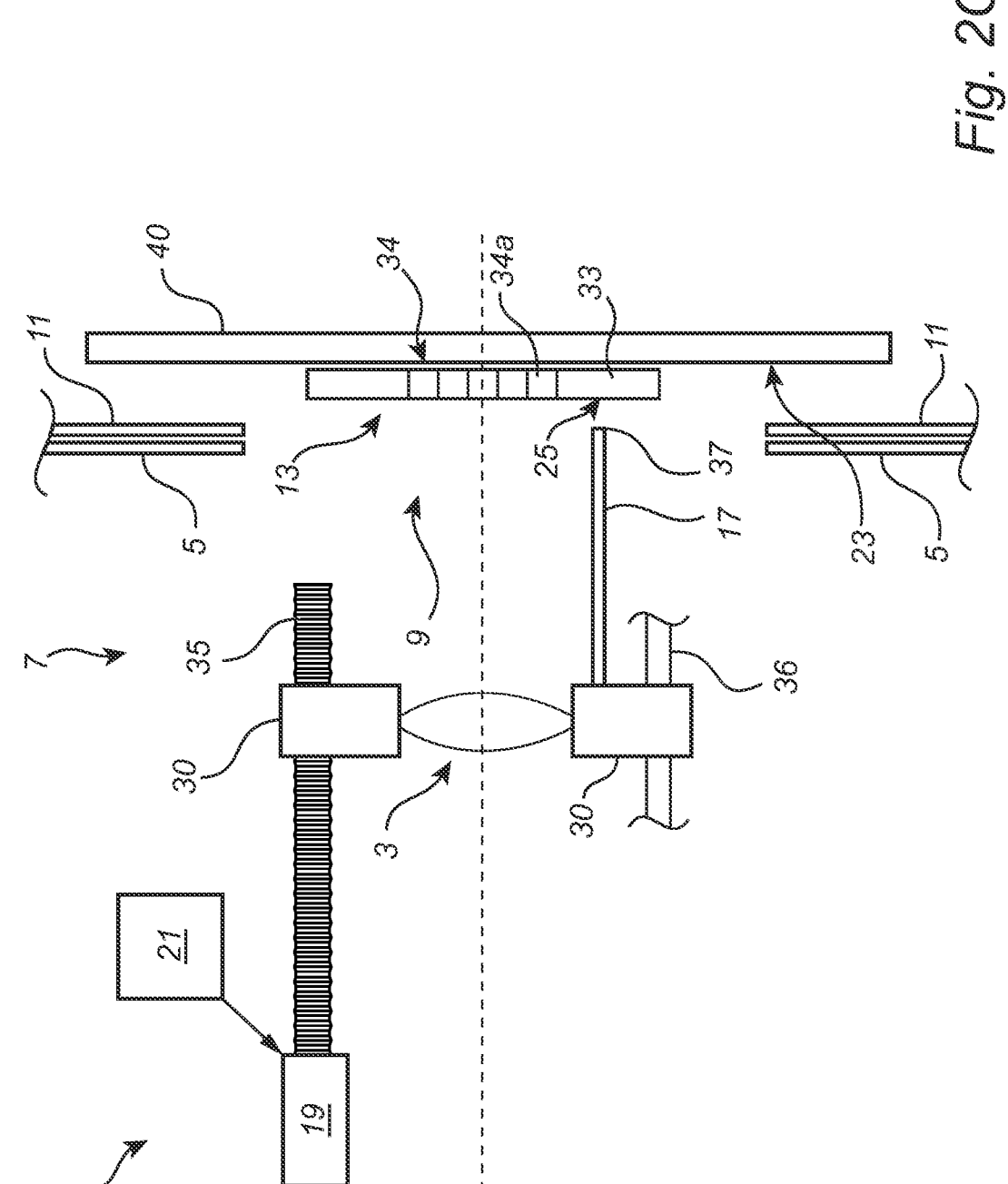
FIG. 2C conceptually illustrates an optical system in a third position according to embodiments of the disclosure.

Thus, starting from the first position of in FIG. 2A, the control system 21 may control the actuator system 19 to move the at least one lens 3 and the probe to the second position shown in FIG. 2B, where the probe has hit the surface 25, which preferably is a surface of the image sensor 13. Consequently, the end portion 37 of the probe is configured to hit the surface 25 of the image sensor 13 when the image sensor housing 11 is attached to the lens housing 5 and the probe 17 is moved to the image sensor location. From this position, the control system 21 can move the at least one lens 3, which may be referred to as a lens group 3, to a position to achieve the desired imaging setting, as conceptually shown in FIG. 2C.

Preferably, the surface 25 that the probe end 37 hits is an inactive part 33 of the image sensor 13, not including any of the pixels 34*a* of the active part 34. For example, a side frame, edge area, or unused part of a sensor die may serve as an inactive part 33. Preferably, the surface 23 is a cover glass of the image sensor. However, it is also envisaged that the probe 17 is configured to reached and hit another surface fixed in relation to the image sensor, such as the surface 23 of a printed circuit board 40 supporting the image sensor 17. The surface 25 of the inactive part 33 may be in the same plane as the pixels 34*a*. A pixel 34*a* is conceptually shown and denoted for sake of illustration. The size of the pixel is not to scale.

The actuation system 19 may be an electric motor 19 connected to an axle 35. For example, the axle 35 is threaded with its threads engaged with a threaded hole of the lens holder 30. The motor 19 is configured to cause the axle 35 to rotate about its axis whereby the threaded connection causes the at least one lens 3 to move along the optical axis 15 being parallel with the axis of the axle 35.

The electric motor 19 may be a step motor. Once the position of the image sensor is found by using the probe 17, the control system 21 may be configured to operate the step motor to run a predetermined number of steps to achieve a desired imaging setting.

The calibration of the lens position may be performed in different situations. For example, the control system 21 may be configured to, upon start of the camera system 100, perform a calibration of lens positions by controlling the motion of the at least one lens 3 to find the position of the at least one lens 3 relative the image sensor 13 using the herein discussed probe motion, and use the position for achieving a desired imaging setting.

As a further example, the control system 19 may be configured to receive an indication that a present imaging performance has drifted from a desired imaging setting. The drift may be detected from feedback from the image sensor that acquired images are out of focus. In response, the control system 19 can control the actuation system 19 to move the at least one lens 3 towards the image sensor 13, and, when it is detected that the motion of the probe 19 is prevented, conclude that the location of the image sensor is found, and to move the at least one lens 3 relative to the found position for achieving the desired imaging setting.

As a further example, if a high temperature difference is known to occur at the location of the camera system 100 which may lead to loosing focus, the control system 19 may, in response control the actuation system 19 to move the at least one lens 3 towards the image sensor 13 to find the image sensor 13 and move the at least one lens 3 relative to the found position for achieving the desired imaging setting. Material thermal expansion may be corrected for in this way. The control system 19 may receive a signal indicative of the temperature difference from an external sensing system or from a temperature sensing system of the camera 100 itself.

It should be understood that the at least one lens 3 may comprise a group of lenses.

Figure 3:
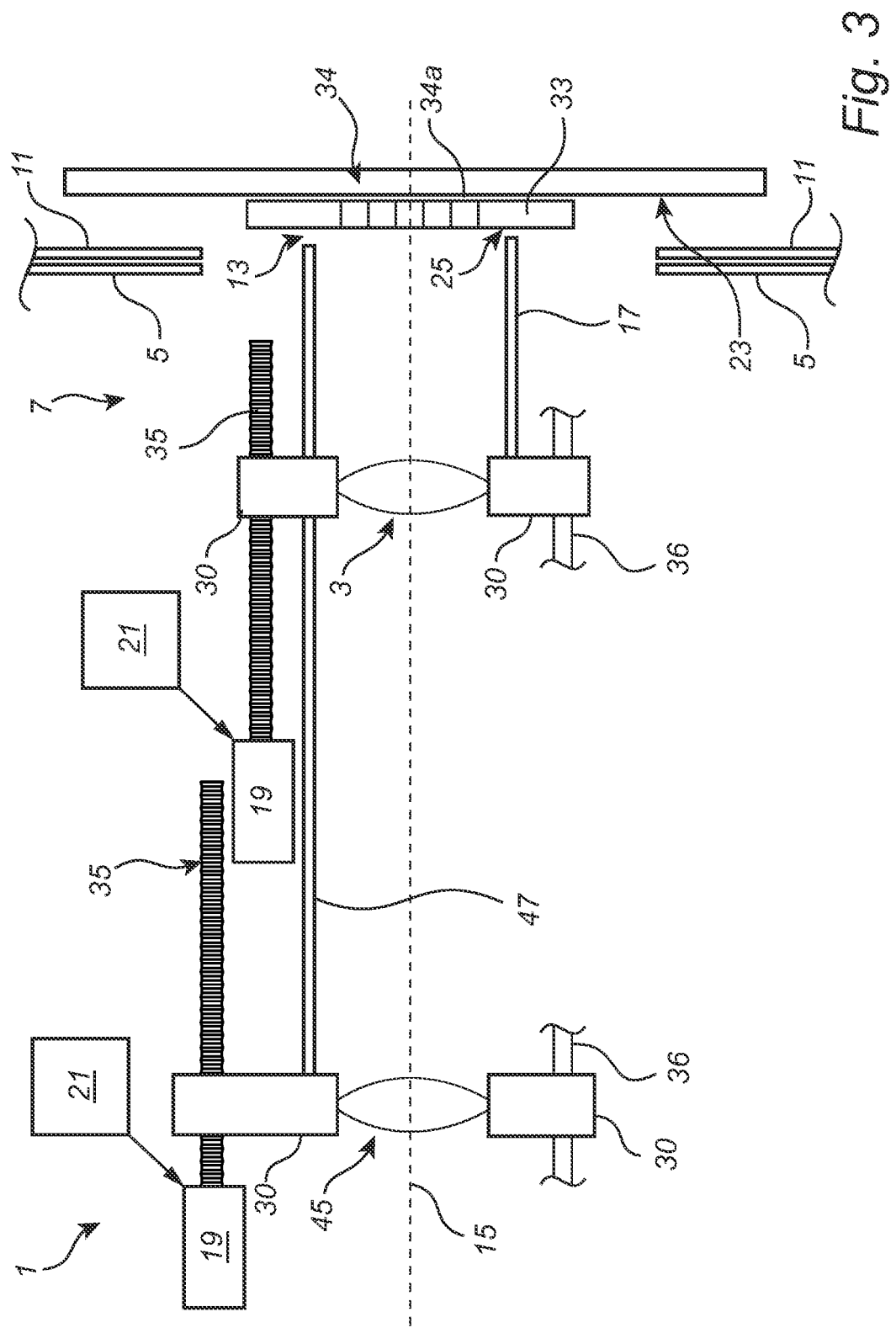
FIG. 3 conceptually illustrates an optical system according to embodiments of the disclosure.

Now turning to FIG. 3, the optical system 1 may comprise a plurality of lens groups 3, 45, and one probe 17, 47 for each lens group. In the example embodiment, two lens groups are shown, but the disclosure is equally applicable to arbitrary number of lens groups, with one probe per lens group.

In FIG. 3, the second probe 47 is connected to the lens holder 49 of the second lens group 45. The second lens group is arranged along the optical axis 15 further from the opening 9 in the lens housing 5 compared to the first lens group 3. The second probe 49 may be slidably arranged through a through hole of the lens holder 31 of the first lens group 3. The motion of the second lens group 45 and second probe 47 is controlled by the control system 21. The control system 21 is configured to control an actuation system, e.g., motor 20, dedicated for the second lens group 45 and probe 47. The second lens group 45 and second probe 47 are thus moveable independently of the first lens group 3 and first probe 17 and vice versa, for calibrating their positions independently. The control systems 21 may be provided as a single control system comprising a single control unit, or separate control systems 21 may be provided for controlling respective actuating systems 19, 20.

The control system 21 may be provided as a control unit for controlling an actuating system 19, 20 for moving a lens group.

Figure 4:
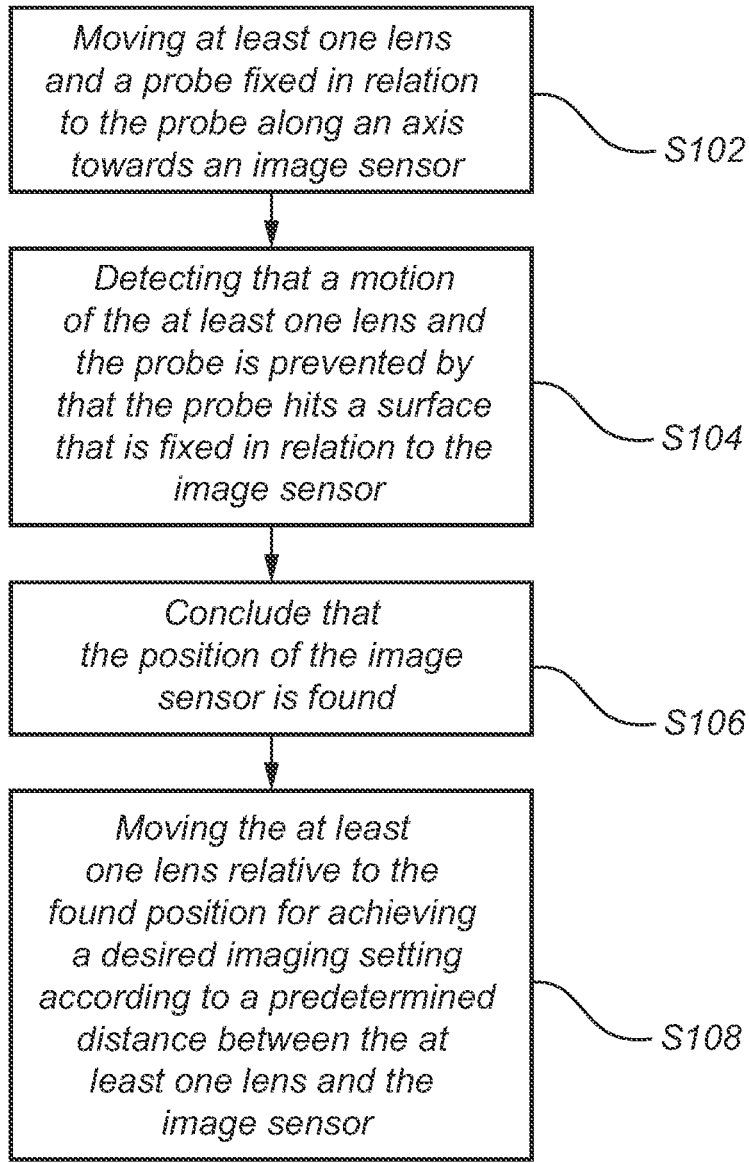
FIG. 4 is a flow-chart of method steps according to embodiments of the disclosure.

FIG. 4 is a flow-chart of method steps according to embodiments of the present disclosure.

According to step S102, the control unit is configured to move at least one lens 3 and a probe 17 fixed in relation to the at least one lens 3 along an axis 15 towards an image sensor 13. The probe 17 is moved out through an opening 9 of a lens housing 5 accommodating the at least one lens 3 and the probe 17.

According to step S104, the control unit detects that a motion of the at least one lens 3 and the probe 17 is prevented by that the probe 17 hits a surface 23, 25 that is fixed in relation to the image sensor 13.

According to step S106, the control unit concludes that the position of the image sensor 13 is found.

According to step S108, the control unit controls the actuator system 19 to move the at least one lens 3 relative to the found position for achieving a desired imaging setting according to a predetermined distance between the at least one lens 3 and the image sensor 13.

The control unit includes a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A camera system comprising:
   an image sensor arranged in an image sensor housing;
   a lens system comprising at least one movable lens;
   a lens housing accommodating the lens system and comprising an opening, the lens housing is removably attached to the image sensor housing so that the at least one lens, the opening, and the image sensor are arranged along an axis with the opening between the at least one lens and the image sensor;
   a probe extending towards the opening and that is fixed in relation to the at least one lens;

an actuation system configured to move the at least one lens along the axis and the probe parallel with the axis, relative to the opening so that the probe reaches out through the opening to a location where the image sensor is arranged; and a control system configured to control the actuation system to move the at least one lens and the probe and to detect that a motion of the at least one lens and the probe is prevented by that the probe hits a surface of the image sensor.

2. The camera system according to claim 1, wherein the control system is configured to, when it is detected that the motion of the probe is prevented, conclude that the position of the image sensor is found, and move the at least one lens relative to the found position for achieving a desired imaging setting according to a predetermined distance between the at least one lens and the image sensor.

3. The camera system according to claim 1, comprising a lens holder attached to at least one lens, wherein the probe is attached to the lens holder.

4. The camera system according to claim 3, wherein the probe and the lens holder are made in a single piece.

5. The camera system according to claim 4, wherein the probe and the lens holder are molded in a single mold.

6. The camera system according claim 1, wherein the surface is an inactive part of the image sensor, wherein the probe is configured to reach the inactive part of the image sensor when the image sensor housing is attached to the lens housing and the probe is moved to the image sensor location.

7. The camera system according to claim 1, wherein the actuation system comprises a motor and an axle attached to a lens holder for moving the at least one lens.

8. The camera system according to claim 1, wherein the probe is elongated with one end portion being configured to reach the location where the image sensor is arrangeable when the at least one lens is moved towards the opening.

9. The camera system according to claim 1, wherein the control system is configured to receive an indication that a present imaging performance has drifted from a desired imaging setting, and, in response, control the actuation system to move the at least one lens, and, when it is detected that the motion of the probe is prevented, conclude that the location of the image sensor is found, and to move the at least one lens relative to the found position for achieving the desired imaging setting.

10. The camera system according to claim 1, comprising a plurality of lens groups, and one probe for each lens group.

11. The camera system according to claim 1, wherein the control system is configured to, upon start of the camera system, perform a calibration of lens positions by controlling the motion of the at least one lens to find the position of the at least one lens relative the image sensor, and use the position for achieving a desired imaging setting.

12. A method for positioning of a lens group relative to an image sensor, comprising:

moving at least one lens and a probe fixed in relation to the at least one lens along an axis towards an image sensor, the probe is moved out through an opening of a lens housing accommodating the at least one lens and the probe;

detecting that a motion of the at least one lens and the probe is prevented by that the probe hits a surface of the image sensor;

concluding that the position of the image sensor is found; and moving the at least one lens relative to the found position for achieving a desired imaging setting according to a predetermined distance between the at least one lens and the image sensor.

13. A control unit configured to control an actuating system for moving a lens group relative to an image sensor, the control unit being configured to move at least one lens and a probe fixed in relation to the at least one lens along an axis towards an image sensor, the probe being moved out through an opening of a lens housing accommodating the at least one lens and the probe;

detect that a motion of the at least one lens and the probe is prevented because the probe hits a surface of the image sensor;

conclude that a position of the image sensor is found; and move the at least one lens relative to the found position for achieving a desired imaging setting according to a predetermined distance between the at least one lens and the image sensor.

* * * * *